UNITED STATES PATENT OFFICE.

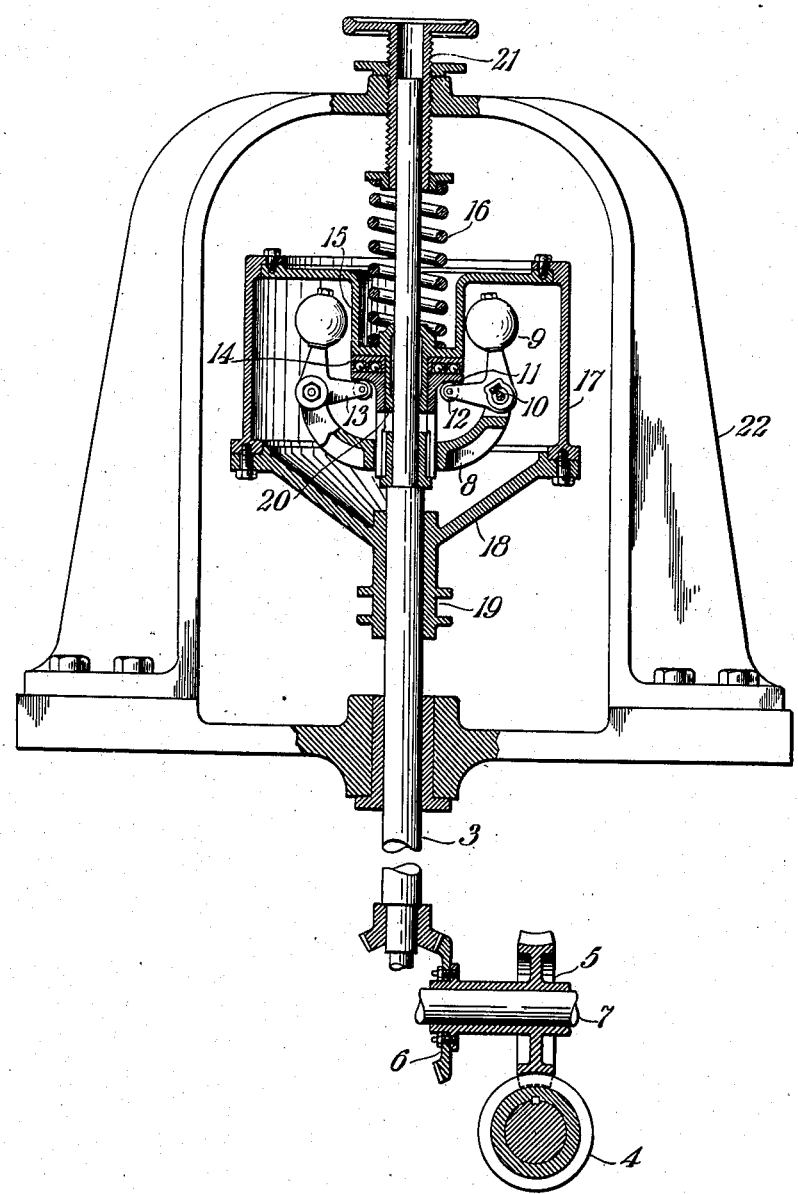

FRANCIS HODGKINSON, OF EDGEWOOD PARK, PENNSYLVANIA, ASSIGNOR TO THE WESTINGHOUSE MACHINE COMPANY, A CORPORATION OF PENNSYLVANIA.

GOVERNOR.

No. 900,852.  Specification of Letters Patent.  Patented Oct. 13, 1908.

Application filed April 7, 1905, Serial No. 254,419. Renewed September 13, 1907. Serial No. 392,761.

*To all whom it may concern:*

Be it known that I, FRANCIS HODGKINSON, a subject of the King of Great Britain and Ireland, residing at Edgewood Park, in the county of Allegheny and State of Pennsylvania, have invented a new and useful Improvement in Governors, of which the following is a specification.

This invention relates to centrifugal governors and has as an object the production of a governor in which the friction between the moving parts is reduced to a minimum, so that the governor will readily respond to the slightest changes in the speed of the engine or the machine to which it is attached.

When two bodies are at rest and their surfaces in contact, the force which tends to resist any sliding motion between the surfaces is called "friction of rest". After the surfaces have started to slide upon each other, the frictional resistance to their relative motion is called "the friction of motion".

In centrifugal governors weights are usually employed which revolve about a fixed axis at a speed proportional to the speed of the engine or machine to be governed. The weights are so hung that they swing towards and away from their axis of revolution upon variations in the speed of the engine or machine and the variations in their position, relative to their axis of rotation, cause variations in the amount of motive fluid delivered to the engine to be governed. In all governors known to me, this swinging motion of the centrifugal balls, or weights, is transferred to the speed regulating device, through the medium of a rotating sleeve sliding on a rotating spindle, or through a stationary sleeve sliding on a stationary spindle. In such construction, the balls in changing their position, must first overcome the friction of rest between the two sliding mediums in addition to a certain amount of sticking in the parts; and when at last the effort is sufficient to move the balls they are apt to overstep the mark and cause oscillations, commonly called "hunting". This objection I overcome in a governor embodying the elements as herein described and illustrated.

In the drawing accompanying this application and forming a part thereof, the single-sheet drawing is an elevation of a centrifugal governor connected with a rotatable shaft.

Referring to the drawing: The spindle 3 of the centrifugal governor is operated by a shaft 4 of the engine to be governed through the agency of gears 5 and 6, which are mounted on a sub-shaft 7. A bracket, which is provided with arms 8, is rigidly secured to the spindle 3 and a centrifugal ball 9 is mounted at the outer end of each arm 8 by means of a knife-edge connection 10. The balls are so mounted that variations in the rotative speed of the spindle 3 cause the balls, through the variations of centrifugal force, to swing about their knife-edge connections and to occupy certain definite positions relative to the spindle 3 for each definite speed of rotation. This oscillating motion of the balls is transmitted to a collar 11, which surrounds the spindle, by roller bearings 12 mounted on arms 13, which are formed integrally with, or rigidly secured to the balls 9. The reciprocating motion transmitted to the collar 11 is transmitted by it, through a ball bearing thrust joint 14, to a portion 15 which operates in opposition to a regulating or adjusting spring 16. The portion 15 is rigidly secured to a cylindrical portion 17 and the portion 17 is in turn secured to a collar 18, which surrounds the spindle 3 and to which, at 19, is attached suitable means (not shown) for transmitting the reciprocating motion of the collar to a fluid-supply valve or other regulating apparatus.

The portion 15, cylinder 17 and the collar 18 are shown in section for convenience of description.

It will be noticed that the collar 11 rotates in transmitting the reciprocating motion on a sleeve 20, which is secured to the portion 15 and which, relative to the collar 11, is stationary; that is, non-rotative. This sleeve 20 and the collar 18 reciprocate on the rotating spindle 3 in transmitting the oscillating motion of the governor balls to the governing apparatus.

The friction of rest between each of these sliding surfaces is, therefore, overcome by the force which rotates the spindle, and the balls oscillate freely without first having to overcome the friction of rest and a tendency to stick at the sliding joints.

Obvious means for adjusting the spring 16 are shown at 21. A suitable weight may, however, be employed, for instance, in connection with the cylinder 17 to perform the functions of the balancing spring 16. The governor is shown in connection with its supporting frame 22, portions of which are shown in section, for convenience.

The application of this invention is not limited to fly-ball governors as it can easily be applied to shaft or inertia governor.

Having now set forth the objects of this invention and appliances embodying the principles thereof, and having described such appliances, their functions and methods of operation, what I claim as new and useful and desire to secure by Letters Patent is:

1. In a speed regulating device, a shaft rotatable synchronously with the apparatus to be regulated, pivoted weights rotatable with said shaft, a member surrounding said shaft and reciprocable by said weights and a stationary sleeve interposed between said shaft and said member.

2. A governing device comprising a shaft rotated synchronously with the apparatus to be governed, a bracket rigidly mounted on said shaft, a centrifugal ball pivotally mounted on said bracket, a reciprocable sleeve surrounding said shaft, a rotatable collar, provided with a ball bearing thrust joint, surrounding said sleeve and located between it and said ball.

3. A governing device comprising a shaft rotated synchronously with the apparatus to be governed, a bracket rigidly mounted on said shaft, a centrifugal ball pivotally mounted on said bracket, a reciprocable sleeve surrounding said shaft, a rotatable collar surrounding said sleeve and located between it and said ball.

4. A governing device comprising a shaft rotated synchronously with the apparatus to be governed, a non-rotatable reciprocable sleeve surrounding said shaft, a bracket mounted on said shaft, a centrifugal weight pivotally mounted on said bracket adapted to reciprocate said sleeve, a collar rotatably mounted on said sleeve and located between it and said weight.

5. A governing device comprising a shaft rotated synchronously with the apparatus to be governed, a spring-restrained, non-rotatable reciprocable sleeve surrounding said shaft, a bracket mounted on said shaft, a centrifugal weight pivotally mounted on said bracket adapted to reciprocate said sleeve, a collar, provided with a ball bearing thrust joint, rotatably mounted on said sleeve and located between it and said weight.

6. A governing device comprising a shaft rotated synchronously with the apparatus to be regulated, a centrifugal weight carried by said shaft, a non-rotatable member inclosing said weight, a sleeve attached to said member and surrounding said shaft, a rotatable collar mounted on said sleeve and located between it and an actuating arm of said weight.

7. In a speed-regulating device, a shaft rotated synchronously with the apparatus to be regulated, pivoted weights rotated by said shaft, a spring-restrained member surrounding said shaft and reciprocated by said weights and a stationary sleeve interposed between said shaft and said member.

8. A governing device comprising a rotatable shaft, a centrifugal weight carried by said shaft, a spring-weighted, non-rotatable member adapted to be reciprocated longitudinally of said shaft by said centrifugal weight, a non-rotatable sleeve secured to said member and surrounding said shaft, a rotatable collar mounted on said sleeve and located between it and said weight and an adjustable means for controlling the operation of said weight.

9. A governing device comprising a rotatable shaft, centrifugal weights carried by said shaft, a non-rotatable member inclosing said weights, a non-rotatable sleeve secured to said member and surrounding said shaft, a collar rotatably mounted on said sleeve and located between it and said weights for transmitting the oscillatory motion of said weights to said member and means for adjustably weighting said member whereby the operation of said weights is controlled.

10. A governing device comprising a rotatable shaft, centrifugal weights carried by said shaft, a non-rotatable member inclosing said weights, a non-rotatable sleeve secured to said member and surrounding said shaft and a collar rotatably mounted on said sleeve and located between it and said weights for transmitting the oscillatory motion of said weights to said member.

11. A governing device comprising a rotatable shaft, a weighted, non-rotatable, reciprocable sleeve surrounding said shaft, a bracket rigidly mounted on said shaft, a centrifugal weight pivotally mounted on said bracket adapted to reciprocate said sleeve, a collar provided with a ball bearing thrust joint rotatably mounted on said sleeve and located between it and said weight.

In testimony whereof I have hereunto subscribed my name this 27th day of March, 1905.

FRANCIS HODGKINSON.

Witnesses:
DAVID WILLIAMS,
C. H. McCONNELL.